United States Patent [19]

Warakomski et al.

[11] Patent Number: 5,990,244

[45] Date of Patent: Nov. 23, 1999

[54] TOUGHENED POLYMER BLENDS

[75] Inventors: John M. Warakomski; David H. Bank, both of Midland, Mich.; Thoi H. Ho, Lake Jackson, Tex.

[73] Assignee: The Dow Chemical Company, Midland, Mich.

[21] Appl. No.: 09/145,044

[22] Filed: Sep. 1, 1998

Related U.S. Application Data

[60] Provisional application No. 60/058,713, Sep. 12, 1997.

[51] Int. Cl.⁶ .................................................. C08F 8/30
[52] U.S. Cl. ................................. 525/179; 525/92
[58] Field of Search ................................. 525/179

[56] References Cited

U.S. PATENT DOCUMENTS

| | | | |
|---|---|---|---|
| 4,454,284 | 6/1984 | Ueno | 524/427 |
| 4,839,425 | 6/1989 | Mawatari | 525/92 |
| 5,086,105 | 2/1992 | Abe | 524/492 |
| 5,219,940 | 6/1993 | Nakano . | |
| 5,270,353 | 12/1993 | Nakano et al. . | |
| 5,273,706 | 12/1993 | Laughner | 264/540 |
| 5,395,890 | 3/1995 | Nakano et al. . | |
| 5,418,275 | 5/1995 | Okada | 524/504 |
| 5,475,053 | 12/1995 | Niessner | 525/64 |
| 5,760,125 | 6/1998 | Ohtomo | 524/508 |

FOREIGN PATENT DOCUMENTS

| | | |
|---|---|---|
| 0320725 | 6/1989 | European Pat. Off. . |
| 324398 | 7/1989 | European Pat. Off. . |
| 0546497 | 6/1993 | European Pat. Off. . |
| 0618267 | 10/1994 | European Pat. Off. . |
| 06116454 | 4/1994 | Japan . |
| 06345923 | 12/1994 | Japan . |
| 07048487 | 2/1995 | Japan . |
| 07048488 | 2/1995 | Japan . |
| 08143729 | 6/1996 | Japan . |
| 08319386 | 12/1996 | Japan . |
| WO 96/37552 | 11/1996 | WIPO . |
| 9711123 | 3/1997 | WIPO . |
| 9711124 | 3/1997 | WIPO . |

*Primary Examiner*—Paul R. Michl

[57] ABSTRACT

A polymer blend comprising:
  a) a syndiotactic monovinylidene aromatic polymer,
  b) a polyamide,
  c) a compatibilizing polymer for a) and b),
  d) a rubbery polyolefin impact modifier, optionally extended with an oil,
  e) a domain forming rubbery polymer,
  f) a polar group functionalized rubbery polyolefin, and
  g) optionally, a compatibilizing polymer for a) and d).

15 Claims, No Drawings

TOUGHENED POLYMER BLENDS

CROSS-REFERENCE STATEMENT

This applications claims the benefit of U.S. Provisional Application No. 60/058,713, filed Sep. 12, 1997.

BACKGROUND OF THE INVENTION

The present invention relates to toughened blends of syndiotactic monovinylidene aromatic and amide polymers.

Blends of syndiotactic monovinylidene aromatic polymers, e.g. syndiotactic polystyrene (SPS) and polyamides, e.g. nylon, are known in the art, having excellent impact and heat resistance. Typically, these types of blends are toughened using various rubbery polymers. For example, U.S. Pat. No. 5,395,890 issued to Nakano et al. discloses a resin composition containing SPS, nylon and optionally a rubbery block polymer. Additionally, U.S. Pat. No. 5,219,940 discloses SPS and polyamide blends, optionally containing block or grafted rubbers. U.S. Pat. No. 5,270,353 discloses blends of SPS with nylon toughened with block and maleated block copolymers. However, block copolymer rubbers are expensive and add significant cost to the blends.

Therefore, there remains a need to obtain more cost effective toughened SPS/polyamide blends while maintaining good impact and heat resistant properties.

SUMMARY OF THE INVENTION

The present invention is a polymer blend comprising:
a) a syndiotactic monovinylidene aromatic polymer,
b) a polyamide,
c) a compatibilizing polymer for a) and b),
d) a rubbery polyolefin impact modifier, optionally extended with oil,
e) a domain forming rubbery polymer,
f) a polar group functionalized rubbery polyolefin, and
g) optionally, a compatibilizing polymer for a) and d).

These blends are more economical than those of the prior art, using polyolefin elastomers as toughening agents, and can be used in markets where high heat resistance is required such as in automotive applications and in applications where nylon alone has been typically used.

DESCRIPTION OF THE PREFERRED EMBODIMENTS

In one embodiment, the present invention is a toughened blend of a syndiotactic monovinylidene aromatic polymer and a polyamide.

As used herein, the term "syndiotactic" refers to polymers having a stereoregular structure of greater than 90 percent syndiotactic, preferably greater than 95 percent syndiotactic, of a racemic triad as determined by $^{13}C$ nuclear magnetic resonance spectroscopy.

Monovinylidene aromatic polymers are homopolymers and copolymers of vinyl aromatic monomers, that is, monomers whose chemical structure possess both an unsaturated moiety and an aromatic moiety. The preferred vinyl aromatic monomers have the formula

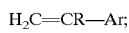

$H_2C=CR—Ar;$ wherein R is hydrogen or an alkyl group having from 1 to 4 carbon atoms, and Ar is an aromatic radical of from 6 to 10 carbon atoms. Examples of such vinyl aromatic monomers are styrene, alpha-methylstyrene, ortho-methylstyrene, meta-methylstyrene, para-methylstyrene, vinyl toluene, para-t-butylstyrene, vinyl naphthalene, divinylbenzene and the like. Syndiotactic polystyrene is the currently preferred syndiotactic monovinylidene aromatic polymer. Typical polymerization processes for producing syndiotactic monovinylidene aromatic polymers are well known in the art and are described in U.S. Pat. Nos. 4,680,353, 5,066,741, 5,206,197 and 5,294,685, which are incorporated herein by reference.

The Mw of the syndiotactic monovinylidene aromatic polymer used in the blend of the present invention is not critical, but is typically from 200,000 to 450,000.

The amount of syndiotactic monovinylidene aromatic polymer present in the blend of the present invention is typically from 10 to 90 weight percent based on the total weight of the blend, preferably from 20 to 80 weight percent and more preferably from 30 to 60 weight percent.

The polyamide of component b) of the blend of the present invention can be any thermoplastic polyamide. Typical polyamides include polyamide4; polyamide-6; polyamide-4,6; polyamide-6,6; polyamide-3,4; polyamide-1,2; polyamide-1,1; polyamide-6,10; polyamide purified from terephthalic acid and 4,4' diaminocyclohexylmethane; polyamide purified from azelaic acid, adipic acid and 2,2,-bis(p-aminocyclohexyl)propane; polyamide purified from adipic acid and methaxylylenediamine; and polyamide purified from terephthalic acid and trimethylhexamethylene diamine.

The Mw of the polyamide is not critical but is typically from 40,000 to 60,000.

The amount of polyamide present in the blend of the present invention is typically from 10 to 90 weight percent based on the total weight of the blend, preferably from 20 to 80 weight percent and more preferably from 30 to 60 weight percent.

The syndiotactic monovinylidene aromatic polymer a), and polyamide b) are typically present in the blend of the present invention in ratios of from 5:95 to 95:5 based on only those two components. Preferably in ratios of 20:80 to 80:20, more preferably 30:70 to 70:30 and most preferably 40:60 to 60:40.

Component c) of the present invention is a polymer which acts as a compatibilizer for the syndiotactic monovinylidene aromatic polymer and the polyamide. This can be any material which has a functionality compatible with the monovinylidene aromatic and a functionality compatible with the amide functional groups. Typically, the compatibilizer is a polyarylene ether having such functionalities. Polyarylene ethers are a known class of polymer having been previously described in U.S. Pat. Nos. 3,306,874, 3,306,875, 3,257,357, and 3,257,358. A preferred polyarylene ether is poly(2,6-dimethyl-1,4-phenylene)ether. The polyphenylene ethers are normally prepared by an oxidative coupling reaction of the corresponding bisphenol compound. Preferred polyarylene ethers are polar group functionalized polyarylene ethers, which are a known class of compounds prepared by contacting polar group containing reactants with polyarylene ethers. The reaction is normally conducted at an elevated temperature, preferably in a melt of the polyarylene ether, under conditions to obtain homogeneous incorporation of the functionalizing reagent. Suitable temperatures are from 150° C. to 300° C.

Suitable polar groups include the acid anhydrides, acid halides, acid amides, sulfones, oxazolines, epoxies, isocyanates, and amino groups. Preferred polar group containing reactants are compounds having up to 20 carbons containing reactive unsaturation, such as ethylenic or aliphatic ring unsaturation, along with the desired polar group functionality. Particularly preferred polar group containing reactants are dicarboxylic acid anhydrides, most preferably maleic anhydride. Typically the amount of polar group functionalizing reagent employed is from 0.01 percent to 20 percent, preferably from 0.5 to 15 percent, most preferably from 1 to 10 percent by weight based on the weight of polyarylene ether. The reaction may be conducted in the presence of a free radical generator such as an organic peroxide or hydroperoxide agent if desired. Preparation of polar group functionalized polyarylene ethers have been previously described in U.S. Pat. Nos. 3,375,228, 4,771,096 and 4,654,405.

The amount of polyarylene ether employed in the present resin blend is beneficially from 0.1 to 20 weight percent, preferably from 0.2 to 10, more preferably from 0.5 to 5 weight percent based on the total blend weight.

In one embodiment of the invention the polar group modified polyarylene ether may be in the form of a coating applied to the outer surface of a reinforcing agent to impart added compatibility between the reinforcing agent and the polymer matrix. The polar group modified polyarylene ether so utilized may be in addition to further amounts of polyarylene ether or polar group modified polyarylene ether also incorporated in the blend. The surface coating is suitably applied to the reinforcing agent by contacting the same with a solution or emulsion of the polar group functionalized polyarylene ether. Suitable solvents for dissolving the polar group functionalized polyarylene ether to form a solution or for use in preparing an emulsion of a water-in-oil or oil-in-water type include methylene chloride, trichloromethane, trichloro-ethylene and trichloroethane. Preferably the concentration of polar group functionalized polyarylene ether in the solution or emulsion is from 0.1 weight percent to 20 weight percent, preferably 0.5 to 5 percent by weight. After coating of the reinforcing agent using either a solution or emulsion, the liquid vehicle is removed by, for example, evaporation, devolatilization or vacuum drying. The resulting surface coating is desirably from 0.001 to 10 weight percent of the uncoated reinforcing agent weight.

The blend of the present invention is toughened using two rubbery polyolefins, one for each polymer phase of a)(syndiotactic monovinylidene aromatic polymer) and b)(polyamide). Component d) is a rubbery polyolefin which toughens the syndiotactic vinyl aromatic phase and can be any elastomeric polyolefin.

Elastomeric polyolefins include any polymer comprising one or more $C_{2-20}$ α-olefins in polymerized form, having Tg less than 25° C., preferably less than 0° C. Examples of the types of polymers from which the present elastomeric polyolefins are selected include homopolymers and copolymers of α-olefins, such as ethylene/propylene, ethylene/1-butene, ethylene/1-hexene or ethylene/1-octene copolymers, and terpolymers of ethylene, propylene and a comonomer such as hexadiene or ethylidenenorbornene. Grafted derivatives of the foregoing rubbery polymers such as polystyrene-, maleic anhydride-, polymethylmethacrylate- or styrene/methyl methacrylate copolymer-grafted elastomeric polyolefins may also be used.

The elastomeric polyolefins are preferably softened by incorporation of an aliphatic oil to extend the polyolefin phase, making it softer and more readily dispersed into the syndiotactic vinyl aromatic polymer phase. The extending oils, also referred to as paraffinic/naphthenic oils, are usually fractions of refined petroleum products having less than about 30 percent by weight of aromatics (by clay-gel analysis) and having viscosities between about 100 and 500 SSU at 100° F. (38° C.). Commercial extending oils include SHELLFLEX® oils, numbers 310, 371 and 311 (which is a blend of 310 and 371), available from Shell Oil Company or Drakeol™, numbers 34 or 35, available from Penreco division of Pennzoil Products Company. The amount of extending oil employed varies from 0.01 to 35.0 weight percent, preferably from 0.1–25 percent, most preferably from 2–25 weight percent based on the weight of the elastomeric polyolefin.

Preferred elastomeric polyolefins for use herein are such polymers that are characterized by a narrow molecular weight distribution and a uniform branching distribution. Preferred elastomeric polyolefins are linear or substantially linear ethylene interpolymers having a density from 0.85 to 0.93 g/cm$^3$, a melt index from 0.1 to 5 g/10 min, and a polydispersity of from 1.8 to 5. Such polymers are preferably those prepared using a Group 4 metal constrained geometry complex by means of a continuous solution polymerization process, such as disclosed in U.S. Pat. Nos. 5,272,236 and 5,278,272, which are hereby incorporated by reference. More preferred elastomeric polyolefins have a density of from 0.860 to 0.920 g/cm$^3$, more preferably from 0.865 to 0.915 g/cm$^3$, and especially less than or equal to 0.910 g/cm$^3$.

The term "interpolymer" as used herein refers to polymers prepared by the polymerization of at least two different monomers. The generic term interpolymer thus embraces copolymers, usually employed to refer to polymers prepared from two different monomers, and polymers prepared from more than two different monomers.

While describing in the present invention a polymer or interpolymer as comprising or containing certain monomers, it is meant that such polymer or interpolymer comprises or contains polymerized therein units derived from such a monomer. For example, if the monomer is ethylene $CH_2=CH_2$, the derivative of this unit as incorporated in the polymer is —$CH_2$—$CH_2$—.

Where melt index values are specified in the present application without giving measurement conditions, the melt index as defined in ASTM D-1238, Condition 190° C./2.16 kg (formerly known as "Condition (E)" and also known as I2) is meant.

The term "substantially linear" ethylene polymer or interpolymer as used herein means that, in addition to the short chain branches attributable to intentionally added α-olefin comonomer incorporation in interpolymers, the polymer backbone is substituted with an average of 0.01 to 3 long chain branches/1000 carbons, more preferably from 0.01 long chain branches/1000 carbons to 1 long chain branches/1000 carbons, and especially from 0.05 long chain branches/1000 carbons to 1 long chain branches/1000 carbons.

Long chain branching is defined herein as a chain length of at least 1 carbon less than the number of carbons in the longest intentionally added α-olefin comonomer, whereas short chain branching is defined herein as a chain length of the same number of carbons in the branch formed from any intentionally added α-olefin comonomer after it is incorporated into the polymer molecule backbone. For example, an ethylene/1-octene substantially linear polymer has backbones substituted with long chain branches of at least 7 carbons in length, but it also has short chain branches of only 6 carbons in length resulting from polymerization of 1-octene.

The presence and extent of long chain branching in ethylene interpolymers is determined by gel permeation chromatography coupled with a low angle laser light scattering detector (GPC-LALLS) or by gel permeation chromatography coupled with a differential viscometer detector (GPC-DV). The use of these techniques for long chain branch detection and the underlying theories have been well documented in the literature, for example in Zimm, G. H. and Stockmayer, W. H., J. Chem. Phys., Vol. 17, p. 1301 (1949) and Rudin, A., Modern Methods of Polymer Characterization, John Wiley & Sons, New York (1991), pp. 103–112.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., U.S.A., presented data demonstrating that GPC-DV is a useful technique for quantifying the presence of long chain branches in substantially linear ethylene interpolymers. In particular, deGroot and Chum found that the level of long chain branches in substantially linear ethylene homopolymer samples measured using the Zimm-Stockmayer equation correlated well with the level of long chain branches measured using $^{13}$C NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/1-octene copolymers.

deGroot and Chum also showed that a plot of Log(I2, Melt Index) as a function of Log(GPC, Weight Average Molecular Weight) as determined by GPC-DV illustrates that the long chain branching aspects (but not the branching extent) of substantially linear ethylene polymers are comparable to that of high pressure, highly branched low density polyethylene (LDPE) and are clearly distinct from ethylene polymers produced using Ziegler-type catalysts such as hafnium and vanadium complexes.

The empirical effect of the presence of long chain branching in the substantially linear ethylene/α-olefin interpolymers used in the invention is manifested as enhanced rheological properties which are quantified and expressed herein in terms of gas extrusion rheometry (GER) results, and/or in terms of melt flow ratio (I10/I2) increase.

In contrast to the term "substantially linear", the term "linear" means that the polymer lacks measurable or demonstrable long chain branches, i.e., the polymer is substituted with an average of less than 0.01 long branches/1000 carbons.

Substantially linear ethylene interpolymers as used herein are further characterized as having
  (i) a melt flow ratio, I10/I2 ≧5.63,
  (ii) a molecular weight distribution or polydispersity, Mw/Mn, as determined by gel permeation chromatography and defined by the equation: (Mw/Mn)=(I10/I2)−4.63,
  (iii) a critical shear stress at the onset of gross melt fracture, as determined by gas extrusion rheometry, of greater than 4×10$^6$ dynes/cm$^3$, or a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an I2, Mw/Mn and density within 10 percent of the substantially linear ethylene polymer and wherein the respective critical shear rates of the substantially linear ethylene polymer and the linear ethylene polymer are measured at the same melt temperature using a gas extrusion rheometer, and
  (iv) a single differential scanning calorimetry, DSC, melting peak between −30° C. and 150° C.

Determination of the critical shear rate and the critical shear stress in regards to melt fracture as well as other rheology properties such as the "rheological processing index" (PI) is performed using a gas extrusion rheometer (GER). The gas extrusion rheometer is described by M. Shida, R. N. Shroff and L. V. Cancio in Polymer Engineering Science, Vol. 17, No. 11, p. 770 (1977), and in Rheometers for Molten Plastics, by John Dealy, published by Van Nostrand Reinhold Co. (1982) on pp. 97–99. The processing index is measured at a temperature of 190° C., at nitrogen pressure of 2500 psig (17 Mpa) using a 0.0296 inch (0.0117 cm) diameter, 20:1 L/D die with an entrance angle of 180°. The GER processing index is calculated in millipoise units from the following equation:

$$PI = 2.15 \times 10^6 \text{ dynes/cm}^2/(1000 \times \text{shear rate}),$$

where: 2.15×10$^6$ dynes/cm$^2$ is the shear stress at 2500 psi, (17 Mpa) and the shear rate is the shear rate at the wall represented by the following equation: 32Q'/(60 sec/min) (0.745)(diameter×2.54 cm/in)$^3$, where Q' is the extrusion rate (g/min), 0.745 is the melt density of the polyethylene (g/cm$^3$), and diameter is the orifice diameter of the capillary (inches).

The PI is the apparent viscosity of a material measured at apparent shear stress of 2.15×10$^6$ dyne/cm$^2$.

For the substantially linear ethylene polymers described herein, the PI is less than or equal to 70 percent of that of a comparative linear olefin polymer having an I2 and Mw/Mn each within 10 percent of the substantially linear ethylene polymers.

The rheological behavior of substantially linear ethylene polymers can also be characterized by the Dow Rheology Index (DRI), which expresses a polymer's "normalized relaxation time as the result of long chain branching." (See, S. Lai and G. W. Knight "ANTEC '93 Proceedings, INSITE™ Technology Polyolefins (ITP)—New Rules in the Structure/Rheology Relationship of Ethylene/α-Olefin Copolymers," New Orleans, La., U.S.A., May 1993.) DRI values range from 0, for polymers which do not have any measurable long chain branching (for example, TAFMER™ products available from Mitsui Petrochemical Industries and EXACT™ products available from Exxon Chemical Company), to 15 and is independent of melt index. In general, for low- to medium-pressure ethylene polymers (particularly at lower densities), DRI provides improved correlations to melt elasticity and high shear flowability relative to correlations of the same attempted with melt flow ratios. For the substantially linear ethylene polymers useful in this invention, DRI is preferably at least 0.1, and especially at least 0.5, and most especially at least 0.8. DRI can be calculated from the equation:

$$DRI = 3652879 \times \tau_o^{1.00649}/(\eta_o^{-1})/10$$

where $\tau_o$ is the characteristic relaxation time of the material and $\eta_o$ is the zero shear viscosity of the material. Both $\tau_o$ and $\eta_o$ are the "best fit" values to the Cross equation, that is, $\eta/\eta^o=1/(1+(\gamma\cdot\tau^o)^n)$ where n is the power law index of the material, and η and γ are the measured viscosity and shear rate (rad sec$^{-1}$), respectively. Baseline determination of viscosity and shear rate data are obtained using a Rheometric Mechanical Spectrometer (RMS-800) under dynamic sweep mode from 0.1 to 100 rad/sec at 190° C. and a Gas Extrusion Rheometer (GER) at extrusion pressures from 1000 psi to 5000 psi (6.89 to 34.5 MPa), which corresponds to shear stress from 0.086 to 0.43 MPa, using a 0.0754 mm diameter, 20:1 L/D die at 190° C. Specific material determinations can be performed from 140° C. to 190° C. as required to accommodate melt index variations.

An apparent shear stress versus apparent shear rate plot is used to identify the melt fracture phenomena. According to Ramamurthy in Journal of Rheology, Vol. 30(2), pp. 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin." In this disclosure, the onset of surface melt fracture (OSMF) is characterized as the beginning of losing extrudate gloss at which the surface roughness of extrudate can only be detected by 40× magnification. The critical shear rate at onset of surface melt fracture for the substantially linear ethylene polymers is at least 50 percent greater than the critical shear rate at the onset of surface melt fracture of a linear ethylene polymer having about the same I2 and Mw/Mn.

Gross melt fracture occurs at unsteady flow conditions and ranges in detail from regular (alternating rough and smooth or helical) to random distortions. The critical shear rate at onset of surface melt fracture (OSMF) and onset of gross melt fracture (OGMF) will be used herein based on the changes of surface roughness and configurations of the extrudates extruded by a GER.

The substantially linear ethylene polymers used in the invention are also characterized by a single DSC melting peak. The single melting peak is determined using a differential scanning calorimeter standardized with indium and deionized water. The method involves 5 to 7 mg sample sizes, a "first heat" to 150° C. which is held for 4 minutes, a cool down at 10° C./minute to −30° C. which is held for 3 minutes, and heated at 10° C./minute to 150° C. for the "second heat." The single melting peak is taken from the "second heat" heat flow versus temperature curve. Total heat of fusion of the polymer is calculated from the area under the curve.

For polymers having a density of 0.875 g/cm$^3$ to 0.910 g/cm$^3$, the single melting peak may show, depending on equipment sensitivity, a "shoulder" or a "hump" on the low melting side that constitutes less than 12 percent, typically less than 9 percent, and more typically less than 6 percent, of the total heat of fusion of the polymer. Such an artifact is observable for other homogeneously branched polymers such as EXACT™ resins (made by Exxon Chemical Company) and is discerned on the basis of the slope of the single peak varying monotonically through the melting region of the artifact. Such an artifact occurs within 34° C., typically within 27° C., and more typically within 20° C., of the melting point of the single peak. The heat of fusion attributable to an artifact can be separately determined by specific integration of its associated area under the heat flow versus temperature curve.

The term "polydispersity" as used herein is a synonym for the term "molecular weight distribution" which is determined as follows:

The polymer or composition samples are analyzed by gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polymer molecular weights are determined by using appropriate Mark-Houwink coefficients for polyethylene and polystyrene (as described by Williams and Word in Journal of Polymer Science, Polymer Letters, Vol. 6, p. 621 (1968), to derive the following equation:

$$M_{polyethylene}=0.4316(M_{polystyrene}).$$

Weight average molecular weight, Mw, is calculated in the usual manner according to the following formula:

Mw=Σi wi·Mi, where wi and Mi are the weight fraction and molecular weight, respectively, of the ith fraction eluting from the GPC column.

The rubbery polyolefin impact modifier d) is typically present in the blend of the present invention in amounts from 0.1 to 10 weight percent based on the total blend weight, preferably from 0.5 to 7, more preferably from 1 to 5 weight percent. The rubbery polyolefin impact modifier is typically from 2 to 25 weight percent of the syndiotactic monovinylidene aromatic polymer phase.

The syndiotactic monovinylidene aromatic polymer of a) and rubbery polyolefin elastomer of d) are typically present in ratios of from 50:50 to 99:1 based on only those two components. Preferably 80:20 to 99:1, more preferably 85:15 to 98:2 and most preferably 90:10 to 97:3.

Component e) of the present invention comprises one or more domain forming rubbery polymers. Such rubbery polymers are suitably chosen in order to impart impact absorbing properties to the polymer composition and enhance the toughening performance of the rubbery polyolefin elastomer of d). Generally, it is desirable to provide a domain forming rubbery polymer having extremely high melt viscosity, that is, very low melt flow. Such polymers having high melt viscosity are not drawn into extremely thin sections by the shear forces of the compounding process, and retain greater ability to reform discrete rubber particles more closely resembling spherical particles upon discontinuance of shearing forces. Additionally, the domain forming rubbery polymer beneficially should retain sufficient elastic memory to reform droplets in the melt when shearing forces are absent. One beneficial result of the present combination appears to be that the domain forming rubbery polymer is selected to be compatible with the rubbery polyolefin elastomer into which it mostly partitions under processing condition. Within such domain, the shearing forces are not as detrimental to rubber domain formation as when the domain forming rubbery polymer is incorporated directly into the matrix resin.

Generally, higher molecular weight domain forming rubbery polymers possess increased melt viscosity. Accordingly, preferred domain forming rubbery polymers are those having Mw from 100,000 to 400,000 Daltons, more preferable from 150,000 to 300,000 Daltons, and having Tg less than 25° C., more preferably less than 0° C. Weight average molecular weights recited herein are apparent values based on a polystyrene standard, derived from gel permeation chromatography data, and not corrected for hydrodynamic volume differences between polystyrene and other polymeric components. Low molecular weight block copolymers, that is, polymers having molecular weight less than 100,000 Daltons, have been found to possess insufficient melt viscosity to achieve the desired rubber droplet formation. Most preferred domain forming rubbery polymers are those having a melt flow rate, Condition X (315° C., 5.0 Kg) from 0 to 0.5 g/10 min. Typical domain forming rubbery polymers include lower molecular weight (higher melt index) copolymers of styrene and a rubber such as butadiene or isoprene, including styrenelbutadiene/styrene triblock copolymers, hydrogenated styrene/butadiene/styrene triblock copolymers, styrene/butadiene block copolymers, styrene/isoprene block copolymers, or a hydrogenated versions thereof. Preferred block copolymers are those containing from 20 to 75 weight percent styrene with the remainder comprising butadiene, isoprene or a hydrogenated derivative thereof.

The domain forming rubbery polymer may also act as the compatibilizer between the syndiotactic monovinylidene aromatic polymer a) and the rubbery polyolefin elastomer d). Typically, such domain forming rubbery block copolymers will act as a compatibilizer if the copolymer contains a compatibilizing amount of monovinylidene aromatic block. Generally, a compatibilizing amount will be at least 30 weight percent, typically at least 40 weight percent, preferably at least 50 weight percent, more preferably at least 60 weight percent and most preferably at least 70 weight percent monovinylidene aromatic block.

Alternatively, a small quantity of a low density polyethylene may also be utilized as the domain forming rubbery polymer. Suitable low density polyethylene polymers include linear interpolymers of ethylene and at least one further α-olefin, most preferred are homogeneous linear interpolymers. Preferred α-olefins have from 3 to 20 carbon atoms. More preferred a-olefins have from 3 to 8 carbon atoms. Exemplary comonomers include propene, 1-butene, 1-pentene, 4-methyl- 1-pentene, 1-hexene, and 1-octene. The low density polyethylene may also contain, in addition to the α-olefin, one or more further comonomers, such as diolefins, ethylenically unsaturated carboxylic acids (both mono- and difunctional) as well as derivatives of these acids, such as esters and anhydrides. Exemplary of such additional comonomers are acrylic acid, methacrylic acid, vinyl acetate and maleic anhydride. The low density polymers suitable for use in the present compositions can be further characterized by their homogeneity and degree of long chain branching.

Preferred quantities of the domain forming rubbery polymer are from 2 to 30, most preferably 5 to 25 weight percent based on the weight of the rubbery polyolefin elastomer d). The rubbery polyolefin elastomer and domain forming rubbery polymer (components d) and e)) are typically present in ratios of from 60:40 to 100:0 based on only those two components, preferably 70:30 to 95:5 and more preferably 80:20 to 90:10.

The domain forming rubbery polymer is typically present in amounts of 0.1 to 5 weight percent based on the total weight of the blend, preferably from 0.1 to 3 weight percent, and more preferably from 0.1 to 1 weight percent.

The rubbery polyolefin elastomer of c) and domain forming rubbery polymer of e) are typically present in ratios of from 60:40 to 99:1 based on only those two components, preferably 70:30 to 95:5, and more preferably 85:15 to 90:10.

The polyamide phase b) is toughened by a polar group functionalized polyolefin, Component f). Typical functional groups include carboxylic acids, carboxylic acid esters, anhydrides, amines, amides, epoxies, maleimides and any other functional group which will compatibilize the polyolefin with the polyamide phase. The preferred functional groups are those groups which can react with the polyamide during melt blending, such as amines, epoxies, anhydrides and carboxylic acids. Typically the functionalized polyolefin is a maleated polyolefin. Maleated polyolefins are known in the art and are typically obtained by grafting maleic anhydride onto the polyolefin backbone. The polyolefin may be the same as the rubbery polyolefin elastomer used to toughen the syndiotactic monovinylidene aromatic phase or different. Typical maleated polyolefins include maleated alpha-olefins such as ethylene-octene copolymer, ethylene-hexene copolymer, ethylene-heptene copolymer and the like.

Maleation of the polyolefin may be done by in the melt, in solution, or in the solid state, and the process can be either continuous or batch. Various free radical initiators, including peroxides and azo compounds may be used to facilitate the maleation. All of these processes are well know and fully described in the art. Maleating agents can include anhydrides such as maleic anhydride, unsaturated dicarboxylic acids such as fumaric acid or other agents listed in columns 6–7 of U.S. Pat. No. 5,219,940.

The amount of polar group functionalized rubbery polyolefin in the blend of the present invention is typically from 0.1 to 10 weight percent based on the total weight of the blend, preferably from 0.5 to 7, and more preferably from 1 to 5 weight percent. The amount of polar group functionalized rubbery polyolefin present based on the amount of polyamide is typically from 2 to 25 weight percent.

The polyamide of b) and polar group-functionalized polyolefin elastomer of f) are typically present in ratios of from 50:50 to 99:1 based on only those two components, preferably 80:20 to 99:1, more preferably 85:15 to 98:2 and most preferably 90:10 to 97:3.

Optionally, a compatibilizing polymer, Component g) which acts as a compatibilizer for the syndiotactic monovinylidene aromatic polymer a) and the rubbery polyolefin elastomer d) is included in the blend of the present invention. A compatibilizing polymer is necessary if the domain forming rubbery polymer is not a compatibilizing polymer for components a) and d). A compatibilizing polymer typically comprises a block copolymer such as a lower molecular weight (higher melt index) styrene/butadiene/styrene triblock copolymer, a hydrogenated styrene/butadiene/styrene triblock copolymer, or a styrenelbutadiene diblock copolymer, a styrene/isoprene block copolymer, or a hydrogenated derivative thereof. Preferred block copolymers are those containing from 45 to 75 weight percent styrene with the remainder comprising butadiene, isoprene or a hydrogenated derivative thereof.

A typical ratio of rubbery polyolefin impact modifier of d) to domain forming rubbery polymer of e) to compatibilizing agent of g) is 75:15:10 by weight.

Nucleators may also be used in the blend of the present invention and are compounds capable of reducing the time required for onset of crystallization of the syndiotactic monovinylidene aromatic polymer upon cooling from the melt. Nucleators provide a greater degree of crystallinity in a molding resin and more consistent levels of crystallinity under a variety of molding conditions. Higher levels of crystallinity are desired in order to achieve increased chemical resistance. In addition crystal morphology may be desirably altered. Examples of suitable nucleators for use herein are metal salts, especially aluminum salts of organic acids or phosphonic acids. Especially preferred compounds are aluminum salts of benzoic acid and $C_{1-10}$ alkyl substituted benzoic acid derivatives. A most highly preferred nucleator is aluminum tris(p-tert-butyl)benzoate. The amount of nucleator used should be sufficient to cause nucleation and the onset of crystallization in the syndiotactic vinylaromatic polymer in a reduced time compared to compositions lacking in such nucleator. Preferred amounts are from 0.1 to 5 weight percent, preferably from 0.1 to 3 weight percent and most preferably from 0.2 to 1 weight percent based on the weight of component a).

Additionally a reinforcing agent or filler can be used in the blend of the present invention. Suitable reinforcing agents include any mineral, glass, ceramic, polymeric or carbon reinforcing agent. Such material may be in the shape of fibers having a length to diameter ratio (L/D) of greater than 5. Preferred particle diameters are from 0.1 micrometers to 1 millimeter. Preferred reinforcing agents are glass fibers, glass roving or chopped glass fibers having lengths from 0.1 to 10 millimeters and L/D from 5 to 100. Suitable fillers include nonpolymeric materials designed to reduce the coefficient of linear thermal expansion of the resulting material, to provide color or pigment thereto, to reduce the flame propagation properties of the composition, or to otherwise modify the composition's physical properties. Suitable fillers include mica, talc, chalk, titanium dioxide, clay, alumina, silica, glass microspheres, and various pigments. Preferred fillers are in the shape of particulates having (L/D) less than 5. The amount of reinforcing agent or filler employed is preferably from 10 to 50 weight percent, more preferably from 20 to 40 weight percent based on the total weight of the filled composition.

The reinforcing agent may include a surface coating of a sizing agent or similar coating which, among other functions, may promote adhesion between the reinforcing agent and the remaining components, especially the matrix, of the composition. Suitable sizing agents may contain amine, aminosilane, epoxy, and aminophosphine functional groups and contain up to 30 nonhydrogen atoms. Preferred are aminosilane coupling agents and $C_{1-4}$ alkoxy substituted derivatives thereof, especially 3-aminopropyltrimethoxysilane.

Additional additives such as blowing agents, extrusion aids, antioxidants, plasticizers, stabilizers, ignition resistant additives, and lubricants, may also be included in the composition in amounts up to 10 percent, preferably up to 5 percent, by weight, based on final composition weight.

The blend of the present invention is typically produced by compounding all the components in a mixing device such as an extruder. Mechanical mixing devices such as extruders, ribbon blenders, solution blending or any other suitable device or technique may be utilized. All components (syndiotactic monovinylidene aromatic polymer, non-functionalized polyolefin, polar functionalized polyolefin, domain forming rubbery polymer, compatibilizing polymer, and optional components such as fillers, nucleating agents, stabilizers, and the like) can be compounded together in an extruder. The oil included in the polyolefin phase can be precompounded into the polyolefin elastomer in a separate step or added during the compounding of the blend. Compounding should be done above the melting point of the syndiotactic monovinylidene aromatic polymer. The syndiotactic polystyrene homopolymer has a melting point of 270° C. Excessively high temperatures, such as above 320° C., which can cause polymer degradation should be avoided. Good mixing should be provided, but excessive shear can result in undesirable high temperatures. It is remarkable, that in compounding this complicated blend, all components migrate to form a structure which imparts desirable properties.

The compositions of the present invention are prepared by combining the respective components under conditions to provide uniform dispersal of the ingredients. Alternatively, the polar group functionalized polyarylene ether and polar group functionalized polyolefin may be prepared in situ by reacting the polar group reactant with the polyphenylene ether and further incorporating the molten product directly into the finished blend.

The following examples are provided to illustrate the present invention. The examples are not intended to limit the scope of the present invention and they should not be so interpreted. Amounts are in weight parts or weight percentages unless otherwise indicated.

EXAMPLE I

The formulations in Table 1 are prepared using the following procedure. The polyolefin (PO) elastomer is first compounded with 25 percent Drakeol 34 mineral oil in a separate step on a 40 mm Berstorff twin screw extruder at 180–200° C., at a rate of 200 pounds/hour, and 250 rpm. All additional components are then tumble blended together and compounded through a Werner Pfleiderer ZSK30 twin screw extruder. Barrel temperature settings of 275–280° C., 35 pounds per hour, and screw speed 350 rpm are used. Vacuum (24 inches mercury) is applied at the vent before the die. Strands are cooled in a water bath and pelletized. Injection molding is done on a Mannesmann Demag D 100–275 injection molding machine with barrel temperatures of 305–315° C. and mold temperature of 150° C. Tensile, instrumented impact, and Izod impact testing are measured using standard ASTM methods and conditions including ASTM D256, ASTM D638M-89 and ASTM D3764.

TABLE I

| Components | A** | B* | C* | D* | E | F |
|---|---|---|---|---|---|---|
| SPS (Mw = 300,000) | 33.4 | 33.4 | 33.4 | 33.4 | 33.4 | 33.4 |
| NYLON | 57 | 57 | 57 | 57 | 57 | 57 |
| MA-SEBS | 3.0 | | | 3.0 | | |
| 1% MA/PO | | 3.0 | | | 3.0 | |
| 0.4% MA/PO | | | 3.0 | | | 3.0 |
| PO with oil | | | | 2.25 | 2.25 | 2.25 |
| SEBS | 3.0 | 3.0 | 3.0 | .45 | .45 | .45 |
| SEPS | | | | 0.3 | 0.3 | 0.3 |
| FAPPO | 3.0 | 3.0 | 3.0 | 3.0 | 3.0 | 3.0 |
| pTBBA-Al | .3 | .3 | .3 | .3 | .3 | .3 |
| Irganox 1010 | .3 | .3 | .3 | .3 | .3 | .3 |

MA-SEBS is a maleated graft styrene/ethylene-butylene/styrene block copolymer (about 2 wt. percent maleic anhydride content)
1 percent MA/PO is an ethylene/octene copolymer having density of 0.863 g/cc and melt index of 0.5 modified with 1 wt. percent maleic anhydride
0.4 percent MA/PO is an ethylene/octene copolymer having density of 0.870 g/cc and melt index of 30 modified with 0.4 wt. percent maleic anhydride
PO with oil is an ethylene/octene copolymer having a density of 0.863 g/cc and melt index of 30 extended with oil (25 wt. percent)
SEBS is a styrene/ethylene-butylene/styrene copolymer containing 32 wt percent styrene
SEPS is a styrene/ethylene-propylene/styrene copolymer containing 65 wt. percent styrene
FAPPO is poly(2,6-dimethyl-p-phenylene ether) grafted with 1–2 wt. percent fumaric acid
Irganox 1010 is 3,5-di-tert-butyl-4-hydroxy-neopentanetetraylester of hydrocinnamic acid
pTBBA-Al is aluminum tris(p-tert-butyl)benzoate
**CONTROL
*COMPARATIVE EXAMPLES Table II summarizes the physical properties which are obtained. "MOE 95%" denotes the margin of error for each measurement at the 95 percent confidence level. "Izod" is the notched Izod toughness at room temperature. "Er" is the tensile elongation at rupture, "Tr" is the tensile strength at rupture, and "Modulus" is the tensile modulus, all measured at room temperature.

TABLE II

|   | Rubber for SPS | Rubber for nylon | Izod (ft.lb/in.) | MOE 95% | Er % | MOE 95% | Tr (psi) × $10^3$ | MOE 95% × $10^2$ | Modulus (psi) × $10^5$ | MOE 95% × $10^3$ |
|---|---|---|---|---|---|---|---|---|---|---|
| A** | SEBS | MA-SEBS | 1.0 | 0 | 33 | 9 | 7.3 | 1.51 | 3.68 | 9.67 |
| B* | SEBS | 1% MA/PO | 1.3 | 0.1 | 35 | 2 | 7.22 | .666 | 3.56 | 1.87 |
| C* | SEBS | 0.4% MA/PO | 1.2 | 0.1 | 29 | 6 | 7.56 | 1.22 | 3.77 | 2.22 |
| D* | PO/SEBS/ SEPS | MA-SEBS | 1.2 | 0 | 34 | 10 | 7.25 | .754 | 3.73 | 4.76 |
| E | PO/SEBS/ SBPS | 1% MA/PO | 1.4 | 0.1 | 33 | 9 | 7.09 | 1.22 | 3.7 | 7.14 |
| F | PO/SEBS/ SEPS | 0.4% MA/PO | 1.2 | 0.1 | 20 | 3 | 7.4 | 2.06 | 3.72 | 7.4 |

**CONTROL
*COMPARATIVE EXAMPLES

These results show that polyolefin impact modifiers can be used in place of expensive block copolymer rubbers while maintaining or improving the physical properties.

What is claimed is:

1. A polymer blend comprising:
   a) a syndiotactic monovinylidene aromatic polymer,
   b) a polyamide,
   c) a polyarylene ether,
   d) a rubbery polyolefin elastomer, optionally extended with an oil,
   e) a domain forming rubbery polymer selected from the group consisting of a copolymer of styrene and butadiene, a copolymer of styrene and isoprene, a hydrogenated copolymer derivative thereof, low density polyethylene, and low density polyethylene containing one or more further comonomers selected from diolefins, ethylenically unsaturated carboxylic acids, esters or anhydrides,
   f) a polar group functionalized rubbery polyolefin, wherein the polyolefin may be the same as the rubbery polyolefin elastomer of d) and
   g) optionally, a compatibilizing polymer for a) and d).

2. The blend of claim 1 wherein component a) is syndiotactic polystyrene.

3. The blend of claim 1 wherein component b) is a nylon.

4. The blend of claim 1 wherein the polyarylene ether is poly(2,6-dimethyl-1,4-phenylene)ether.

5. The blend of claim 1 wherein component d) is an ethylene- alpha olefin copolymer.

6. The blend of claim 5 wherein the ethylene-alpha olefin copolymer is an ethylene-octene copolymer.

7. The blend of claim 5 wherein component e) is a block copolymer of styrene and butadiene or styrene and isoprene.

8. The blend of claim 7 wherein the copolymer is a styrene-butadiene-styrene triblock copolymer.

9. The blend of claim 1 wherein component f) is a maleated ethylene-alpha olefin copolymer.

10. The blend of claim 9 wherein the ethylene-alpha olefin copolymer is an ethylene-octene copolymer.

11. The blend of claim 1 wherein component g) is a maleated or carboxylated poly(phenylene ether).

12. The blend of claim 1 wherein component
   a) is from 10 to 90 weight percent,
   b) is from 10 to 90 weight percent,
   c) is from 0.1 to 20 weight percent,
   d) is from 0.1 to 10 weight percent,
   e) is from 0.1 to 5 weight percent,
   f) is from 0.1 to 10 weight percent, and
   g) is from 0 to 5 weight percent.

13. The blend of claim 1 further comprising inorganic fillers.

14. The blend of claim 13 wherein the fillers are glass fibers.

15. Articles prepared from the blend of claim 1.

* * * * *